Nov. 16, 1943.    B. E. SHAW    2,334,447
THERMOSTATIC CONTROL SYSTEM
Filed June 26, 1939
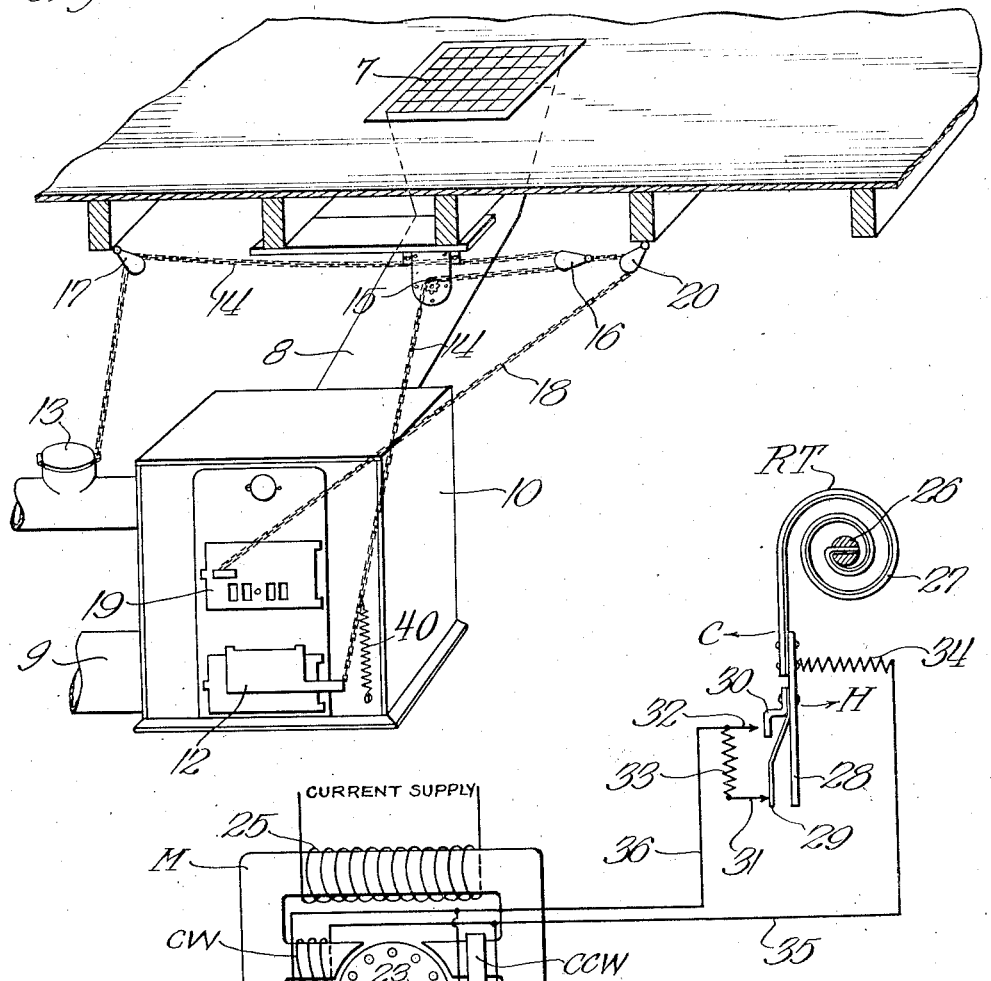
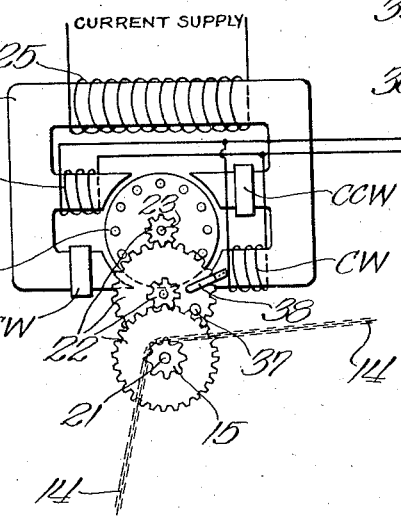
INVENTOR.
Burton E. Shaw
BY Bair & Freeman
ATTORNEYS Patented Nov. 16, 1943

2,334,447

UNITED STATES PATENT OFFICE 2,334,447

THERMOSTATIC CONTROL SYSTEM

Burton E. Shaw, Bristol, Ind., assignor, by mesne assignments, to Crise Electric Manufacturing Company, Columbus, Ohio, a corporation of Ohio Application June 26, 1939, Serial No. 281,121

8 Claims. (Cl. 236—68)

An object of my invention is to provide a thermostatic control system which can be adapted for various uses such as controlling the draft and check of a coal fired furnace, the system being comparatively simple to manufacture and install.

Another object is to provide a thermostatic control system in which a reversing motor of a special shaded pole induction type is connected by two wires to a room thermostat in such manner that the thermostat will operate the motor in either direction, or stall it in an intermediate position when the thermostat is in an intermediate position.

A further object is to provide a reversing motor of the type having two sets of shading coils which are selectively controlled in such manner that the motor may be operated in either desired direction, and to provide a special type of thermostat including two sets of contacts and a resistance element so connected with each other and with the shading coils of the motor that operation of the motor in the desired direction or the stalling thereof in an intermediate position can be accomplished.

Another object is to provide a thermostatic control system in which the room thermostat includes a heating element brought into the circuit at the desired time to reduce the differential of operation of the thermostat to less than its normal mechanical differential.

Still a further object is to provide a reversing motor having a permanently closed shading coil and a selectively closed shading coil, the latter coil when closed predominating the first mentioned coil so as to cause rotation of the motor in a direction opposite to normal and to connect the selectively energizable shading coil with a double contact thermostat or the like having a resistance element between the contacts so that with two wires the thermostat can cause the motor to operate in either direction or to stall in any intermediate position in response to an intermediate position of the thermostat.

Still a further object is to provide means, such as a spring, effective to return the draft of the furnace to closed position and the check thereof to open position in the event of power failure.

With the foregoing and other contemplated as well as obvious objects in view, my present invention contemplates the combination of elements and arrangement of parts, together with circuit connections therefor, to cooperate with each other in the performance of the functions and the accomplishments of the results sought. My thermostatic control system comprises in one of its adaptations a form shown illustratively in the accompanying drawing, wherein Figure 1 is a diagrammatic view of a coal fired furnace to which my thermostatic control system has been applied, and Figure 2 is an electrodiagrammatic view of the system.

On the accompanying drawing I have used the reference numeral 7 to indicate a hot air register. Heat is supplied thereto through a pipe 8 from a furnace 10. The furnace 10 has a cold air intake 9, a draft door 12 and a check door 13. The doors 12 and 13 are operatively connected by a chain 14 to a sprocket 15. Suitable pulleys 16 and 17 are provided over which the chain 14 is extended. Preferably, the pulley 16 is connected by a chain 18 to the firing door 19. A pulley 20 is provided for the chain 18. The purpose of the chain 18 is to permit the draft and check 12 and 13 to close if either of them is open when the firing door 19 is opened.

The sprocket 15 is mounted on a shaft 21 which is driven through suitable step-down gearing 22 from a motor shaft 23. The shaft 23 in turn is driven by a rotor 24 of the motor indicated generally at M. The motor M includes an energizing coil 25 and is of the shaded pole induction type. It is provided with a pair of single turn copper shading rings or coils CCW operable to create a rotating field when the coil 25 is energized with alternating current. The coils CCW effect operation of the rotor 24 in a counterclockwise direction. The motor M further includes clockwise coils CW which are composed of several turns or windings and which are normally open circuited. When the circuit of the coils CW is closed, however, another rotating field is set up in the motor and this field is stronger or predominates that set up by the single turn coils CCW. Therefore the motor then rotates in a clockwise direction.

For controlling energization of the coils CW, I provide a room thermostat RT. The thermostat RT may comprise a stationary or adjustable support 26 for a bimetal element 27. The element 27, of course, is responsive to the temperature of a room or the like to which heat from the furnace 10 is supplied.

A switch blade 28 is carried by the bimetal element 27 and supports a pair of movable contacts 29 and 30. These are adapted to engage stationary contacts 31 and 32, respectively. A resistance element 33 is connected between the contacts 31 and 32.

The room thermostat RT further includes a heating element 34 connected with a wire 35. The contact 32 is connected with a wire 36. The wires 35 and 36 are connected with the clockwise coils CW which are illustrated as being connected in parallel, although they may be connected in series if desired.

I have already explained that energization of the coils CW will rotate the rotor 24 clockwise. With the circuit connections shown in Figure 2, however, the resistance element 33 is in series with the coils CW and thus reduces their energization as compared with a short circuit across wires 35 and 36. The heating element 34 also reduces this energization to some extent, but this can be taken care of by proper relative sizes of the coils CW and the heating element 34. The resistance of the element 33, however, is of such value that when in series with the coils CW, the coils are energized only sufficiently to counteract the energization of the counterclockwise coils CCW. Therefore the motor M will not operate in either direction.

It is obvious that if the blade 28 of the thermostat swings to the left, so as to engage the contact 30 with the contact 32, the resistance element 33 will be shunted out of the circuit, thus increasing the energization of the coils CW, and this will result in rotation of the motor M in a clockwise direction. Reversely, movement of the blade 28 to the right will open the circuit at 29—31 so as to de-energize the coils CW and thereupon the coils CCW will cause operation of the motor M in a counterclockwise direction.

From the foregoing description, it will be obvious that with a two-wire thermostat I am able to secure three steps of control for the motor M from the thermostat and thus operate the motor in a modulated manner. Whenever the thermostat is at either limit of its position the motor will operate, whereas in an intermediate position (with only the contacts 29 and 31 engaged), the motor will remain stationary. The motor is limited in its rotation in either direction by any suitable means such as a stop pin 37 on one of the gears 22 engageable with a stationary stop finger 38.

To compensate for the mechanical differential of operation in the room thermostat RT, I provide the heating element 34, which is energized whenever the coils CW are in circuit. Thereby the temperature ambient to the bimetal element 27 is raised, so that when the heating element 34 is energized in response to lowered room temperature, the heat radiated therefrom and affecting the bimetal element 27 will open the contacts 29 and 31 sooner than they would be opened by the bimetal element unaffected by the heater 34. By way of example, if the mechanical differential of operation is 3°, the heating element 34 may add 2½° of heat and thereby reduce the actual operating differential to ½°.

In order to return the draft door 12 to closed position and the check 13 to open position in the event of power failure, and thus avoid the possibility of the furnace 10 remaining on, I provide a spring 40. One end of the spring 40 is connected to the furnace and the other end to the chain 14. It is obvious that the spring tends to close the draft and open the check.

In the motor M the clockwise coils CW are much stronger than the counterclockwise coils CCW (which may be one turn shading coppers), and therefore when the clockwise coils are energized across the contacts 30 and 32, they operate the motor in a clockwise direction against the bias of the spring 40 when it is used. When the clockwise coils are energized across the contacts 29 and 31, then the coils CW are enough stronger than the coils CCW to keep the motor stalled against the bias of the spring 40. Whenever a power failure occurs, however, the furnace is automatically shut off so as to prevent any danger of overheating.

Although I have illustrated my control system in connection with the draft and check of a furnace, it is obvious that wherever a modulating motor is required and there is a change in temperature or other condition, a control instrumentality including the contacts 29, 30, 31 and 32 and the resistance element 33 may be provided for controlling the motor in two limit positions and an intermediate position of the instrumentality. The result is a modulating type of control in which the circuit connections are reduced to a minimum, whereas heretofore two-way thermostats have been provided for modulating motors and required three wires for operation.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claims appended hereto.

I claim as my invention and desire to secure by Letters Patent of the United States:

1. In a control system, control means, a control instrument, a motor for operating said control means, said motor being of the shaded pole induction type and having a shading coil for effecting rotation thereof in one direction and a second shading coil for effecting rotation thereof in the opposite direction, said control instrument having two sets of contacts and a resistance connected between said sets of contacts, said sets of contacts being in circuit with said second shading coil to effect operation of said motor in response to the first shading coil only when the instrument is in one limit position with both sets of contacts open, to effect operation of said motor in response to both shading coils with the shading effect of the coils substantially balanced when the instrument is in an intermediate position with one set of contacts open and the other set closed, and to effect operation of said motor in response to both shading coils with the shading effect of the second coil predominating when the instrument is in its other limit position with both sets of contacts closed.

2. In a control system, control means, a control instrument, a motor for operating said control means, said motor being of the shaded pole induction type and having a shading coil for normally effecting rotation thereof in one direction and a second shading coil for effecting at times rotation thereof in the opposite direction, said control instrument having a pair of stationary contacts and a movable contact and a resistance element connected between said stationary contacts, said stationary and movable contacts being connected in circuit with said second shading coil to effect operation of said motor in response to the first shading coil when the instrument is in one of its limit positions with said movable contact separated from both of said stationary contacts, to effect stalling of said motor in response to both shading coils in an intermediate position of the instrument with said movable contact engaged with one of said stationary contacts and disengaged from the other one, and to effect operation of said motor in response to the second shading coil when the instrument is in its other limit position with said movable contact engaged with the other of said stationary contacts.

3. In a control system, control means, a thermostat, a motor for operating said control means, said motor being of the shaded pole induction type and having a first, continuously energized shading coil to effect rotation thereof in one direction and a second shading coil to effect rotation thereof in the opposite direction by energization in excess of said first shading coil, said thermostat comprising a movable contact and a pair of stationary contacts, a resistance element connected between said stationary contacts, one of said stationary contacts and said movable contact being in circuit with said second shading coil to effect energization thereof in series with said resistance element when said thermostat is in an intermediate position, the other of said stationary contacts and said movable contact, being in circuit with said second shading coil, shunting out said resistance element when said thermostat is at one limit position to effect energization of said second shading coil alone, both said stationary contacts being out of contact with said movable contact when said thermostat is at its opposite limit position to de-energize the second shading coil, the resistance value of said resistance element being such as to reduce energization of said shading coil in series therewith so that it has substantially the same shading effect as said continuously energized shading coil.

4. In a control system, control means, a thermostat, a motor for operating said control means, said motor being of the shaded pole induction type and having a first shading coil to effect rotation thereof in one direction and a second shading coil to effect rotation thereof in the opposite direction, said thermostat comprising a movable contact and a pair of stationary contacts, a resistance element connected between said stationary contacts, one of said stationary contacts and said movable contact being in circuit with said second shading coil to effect energization thereof in series with said resistance when said thermostat is in an intermediate position, the other of said stationary contacts and said movable contact, being in circuit with said second shading coil, shunting out said resistance element when said thermostat is at one limit position to effect energization of said second shading coil alone, both said stationary contacts being out of contact with said movable contact when said thermostat is at its opposite limit position to de-energize the second shading coil.

5. In a control system, control means, a thermostat, a motor for operating said control means, said motor being of the shaded pole induction type and having a pair of shading coils to effect rotation thereof in opposite directions, said thermostat comprising a movable contact and a pair of stationary contacts, a resistance element connected between said stationary contacts, one of said stationary contacts and said movable contact being in circuit with one of said shading coils to effect energization thereof in series with said resistance when said thermostat is in an intermediate position, the other of said stationary contacts and said movable contact, being in circuit with said second shading coil, shunting out said resistance element when said thermostat is at one limit position to effect energization of said shading coils so as to rotate the motor in one direction, both said stationary contacts being out of contact with said movable contact when said thermostat is at its opposite limit position to effect energization of said shading coils so as to rotate the motor in the other direction.

6. In a control system of the character disclosed, a shaded pole induction type motor including a pair of shading coils, one for effecting rotation of the motor in one direction and the other for effecting rotation thereof in the opposite direction, a sensitive control instrument including two sets of contacts arranged for both sets to be disengaged when the instrument is at one limit position, for one set of contacts to be engaged in an intermediate position and for both sets of contacts to be engaged in the other limit position, one of said sets of contacts being connected with one of said shading coils to energize it to a degree predominating the other shading coil and a resistance element connected between said sets of contacts and of such value as to reduce energization of the second shading coil to a degree substantially equal to that of the first shading coil when said instrument is in its intermediate position.

7. In a control system of the character disclosed, a shaded pole induction type motor including a pair of shading coils, one for effecting rotation of the motor in one direction and the other for effecting rotation thereof in the opposite direction, a heat sensitive control instrument including two sets of contacts arranged to be disengaged when the instrument is in one limit position, for one set of contacts to be engaged in an intermediate position and for both sets of contacts to be engaged in the other limit position, one of said sets of contacts being connected with one of said shading coils to energize it to a degree predominating the other shading coil, a resistance element connected between said sets of contacts to reduce energization of the second shading coil to a degree substantially equal to that of the first shading coil when said instrument is in its intermediate position and a heater in circuit with said sets of contacts and energized whenever either thereof is closed to thereby raise the temperature ambient to said heat sensitive control instrument.

8. In a system of the character described, a control element, a motor for operating said control element, said motor tending to rotate in one direction and including selectively energizable means operable to effect rotation thereof in the opposite direction and a heat sensitive control instrument for said selectively energizable means operable in an intermediate position to effect such energization to a degree that stalls said motor and, in limit positions on opposite sides of an intermediate position, increasing energization of, and de-energizing, said selectively energizable means respectively, and an anticipating heater for said control instrument, said heater being rendered effective by said control instrument in said intermediate, and in one of said limit positions thereof.

BURTON E. SHAW.